United States Patent [19]

Baikoff

[11] 4,303,412
[45] Dec. 1, 1981

[54] METHOD AND APPARATUS FOR COMPRESSIVELY SEPARATING WASTE MATERIAL

[76] Inventor: Eugenè M. A. Baikoff, Chemin des Anciens-Moulins 2A, 1009 Pully (Canton of Vaud), Switzerland

[21] Appl. No.: 131,723

[22] Filed: Mar. 19, 1980

[30] Foreign Application Priority Data

Mar. 27, 1979 [CH] Switzerland ............... 2835/79

[51] Int. Cl.³ ............... C10L 5/08; B30B 9/06
[52] U.S. Cl. ............... 44/1 D; 44/10 A; 44/10 G; 44/13; 100/37; 100/127; 100/244; 100/295
[58] Field of Search ............... 100/116, 126, 127, 218, 100/221, 244, 37, 295; 44/10 A, 10 R, 10 G, 1 D, 13

[56] References Cited

U.S. PATENT DOCUMENTS

| | | | |
|---|---|---|---|
| 2,830,530 | 4/1958 | Powell | 100/244 X |
| 2,904,835 | 9/1959 | Thomas | 100/37 X |
| 3,929,061 | 12/1975 | Banks et al. | 100/116 |
| 4,232,600 | 11/1980 | Le Jeune | 100/116 X |

FOREIGN PATENT DOCUMENTS 419408 10/1910 France .
487552 4/1918 France .
617721 11/1926 France .
2389577 12/1978 France .

*Primary Examiner*—Peter Feldman
*Attorney, Agent, or Firm*—Pollock, Vande Sande & Priddy

[57] ABSTRACT

An apparatus for processing waste material comprises a piston arrangement acting upon a mass of refuse in a receptacle formed by a cylindrical wall and a counter-piston constituting the bottom. The counter-piston can rise in such a way as to block sludge outlets in the cylindrical wall during the initial phase of compression of the waste by the piston arrangement. Thereafter, the counter-piston descends so as to free the sludge outlets when a certain pressure is attained. The compression-piston arrangement comprises two coaxial pistons designed to ensure constant, substantially uniform pressure in the mass of waste. Thus, virtually all liquid, semisolid, or viscous materials can be extracted from the waste to obtain sludge useful in agriculture. Also obtained are virtually dry and non-brittle blocks of refuse which has not been crushed but subjected to internal shearing and contraction, thus yielding a good agglomerate. These blocks may be used as fuel briquettes.

14 Claims, 14 Drawing Figures

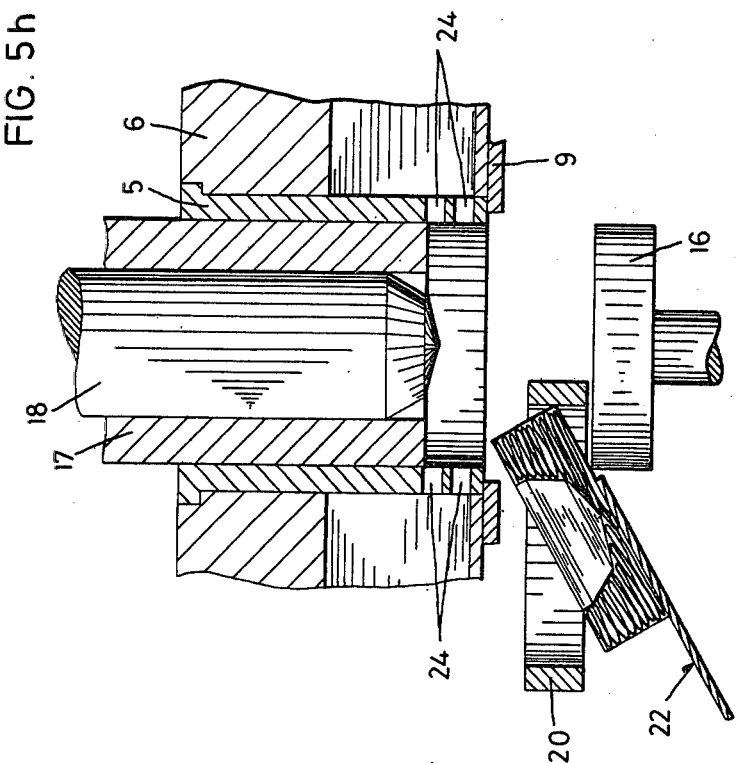
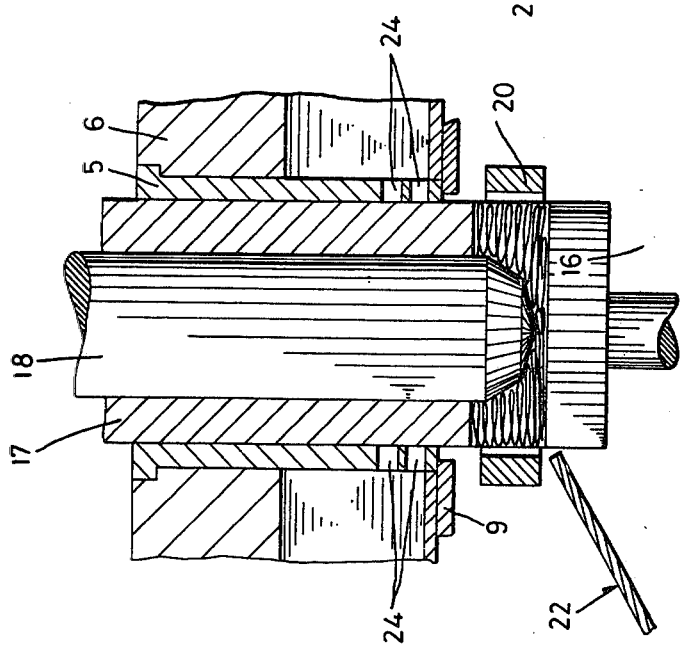

METHOD AND APPARATUS FOR COMPRESSIVELY SEPARATING WASTE MATERIAL

BACKGROUND OF THE INVENTION

This invention relates to the treatment and recycling of waste material, especially waste material which comprises at least some organic matter. More particularly, the invention relates to a method and apparatus for compressively separating such waste material into (a) a liquid or semisolid sludge and (b) solid waste, the sludge containing water together with the organic matter and/or biologically useful materials, and the solid waste being compressed into solid blocks which are cohesive enough to be stored and handled in use, e.g., as fuel briquettes. The extracted sluge may be used as a soil additive.

Machines and methods have already been proposed for separating refuse into liquid or semisolid sludge, on the one hand, and solids substantially devoid of moisture, on the other hand. Commercially available apparatus is at least partially described in French Pat. No. 2,389,577.

However, such prior art machines operate in such a way that the waste material is intensively crushed i.e. a compression piston compresses only part of a mass of refuse contained in a receptacle into a cup shaped mass, then withdraws, whereupon another piston changes the cup-shaped mass produced by the first piston into a cake-shaped mass, into which the first piston returns to compress a new indentation, etc. Hence part of the mass, facing the end of a cylindrical compression piston, is compressed at high pressure, whereas the rest of the mass at the sides of said piston are hardly affected by its action. As a matter of fact, waste materials of all kinds do not behave in accordance with the laws of hydrostatics (which would give the same pressure at all locations), nor do they behave in accordance with the laws of the mechanics of rigid bodies, where the forces are calculated without taking the effects of creep or flow into account. Instead, the laws which govern the phenomenon of compression of a mass of refuse are those of soil mechanics, the principles and details of which are expounded, for instance, in *Soils and Soil Engineering*, by R. H. Karol, Englewood Cliffs, N.J., Prentice-Hall, 1960.

The science of soil mechanics covers various situations, one being the distribution of pressure in soil of theoretically infinite volume, and another being the distribution of pressure in soil assumed to be confined within rigid walls. The fields of isobaric curves, applied to pistons operating according to the particular concept to be proposed here, are of the shapes shown, for example, in FIGS. 1 and 2 of the accompanying drawings. Also of interest in this connection is FIG. 13.3 on page 127 of the aforementioned Karol text.

The present invention is based on the recognition that if all the liquid, semisolid, or viscous material is to be extracted from a mass of waste material, the apparatus used must be designed to create, at least to a certain extent, a homogeneous pressure within the mass of waste. The prior art apparatus referred to above does not meet this requirement, at least not when the compression piston is first forced into a mass of material to be treated. This first operation, as described above, gives the mass the shape of a cup, the bottom of which is highly compressed but the sides of which are hardly compressed at all, and an intermediate operation for reshaping the mass into a cake-shaped mass is therefore necessary, after which another compression takes place, etc. The result of these reshaping operations is to crush the mass and thereby prevent it from retaining a desired cohesiveness and tenacity. Hence the blocks produced by the prior art machines are very brittle and apt to crumble. Moreover, in the prior art machines, the liquid or semisolid sludge (sometimes also referred to as the liquid phase) escapes through grooves disposed along the compression piston. Hence the sludge starts to escape as soon as compression is exerted, and there is no preparatory compression phase without sludge withdrawal. This also seems to contribute toward making the blocks of solid waste more friable, and the solid waste cannot therefore be used as fuel except in the form of the small scraps into which the blocks disintegrate when stored or otherwise handled.

Other arrangements of the same kind are proposed in French Pat. No. 487,552, No. 419,408, and No. 617,721. However, none of these prior disclosures contemplates a separation technique by compression in accordance with the principles of soil mechanics.

SUMMARY OF THE INVENTION

It is an object of this invention to provide an improved method and apparatus, for compressively separating waste material, which differ in design and operation from the prior art and by means of which products of good quality can easily be obtained, particularly as concerns the blocks of solid refuse which, in accordance with this invention, are intended to be used especially as fuel To this end, the improved method of the present invention comprises the steps of filling a receptacle with waste material, compressing the mass in said receptacle by use of a piston arrangement whose structural conformation is such that the entire mass of waste compressed in the receptacle is subjected to substantially uniform pressure, causing internal contraction and shearing within the mass of waste without crushing, and applying the compressive action by a process of gradual elementary advances of the piston arrangement, free of retractions and re-advances, thereby producing a homogeneous and solid block structure.

In the apparatus according to the present invention, the improvement comprises a piston arrangement including at least one piston having a pressure head of a shape exhibiting a frustoconical surface forming a certain angle with the axis of the piston and, at the end of this frustoconical surface, a conical surface forming a larger angle with the axis of the piston than that formed by the frustoconical surface, the dimensions and the angles of these conical and frustoconical surfaces being so determined with respect to the dimensions of the cylindrical waste receptacle as to maintain, by virtue of the laws of soil mechanics, applied in the case of a volume of limited creep, a substantially uniform pressure throughout the mass of waste material in the receptacle.

Certain embodiments of the invention are particularly advantageous as concerns the design, the homogeneity of compression, and the ease of carrying out the method and operating the apparatus.

BRIEF DESCRIPTION OF THE DRAWINGS

A preferred embodiment of the invention will now be described in detail with reference to the accompanying drawings, in which.

DESCRIPTION OF THE PREFERRED EMBODIMENTS

Figure 1:
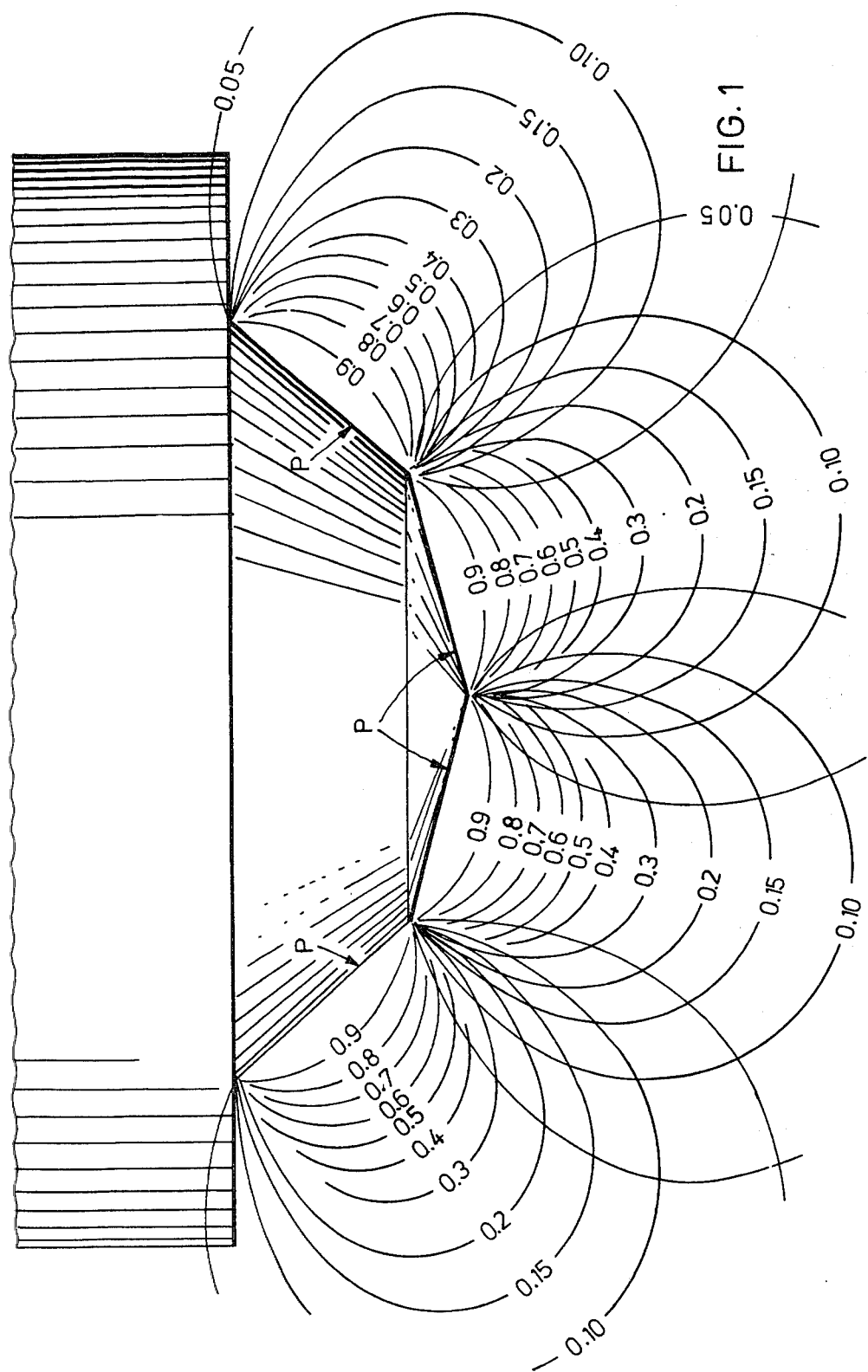
FIG. 1 is a diagram showing the distribution of pressure in a material such as soil or refuse when acted upon by a pressure member having frustoconical and conical surfaces, it being assumed that the creep or flow volume of the soil or refuse is infinite.
Figure 2:
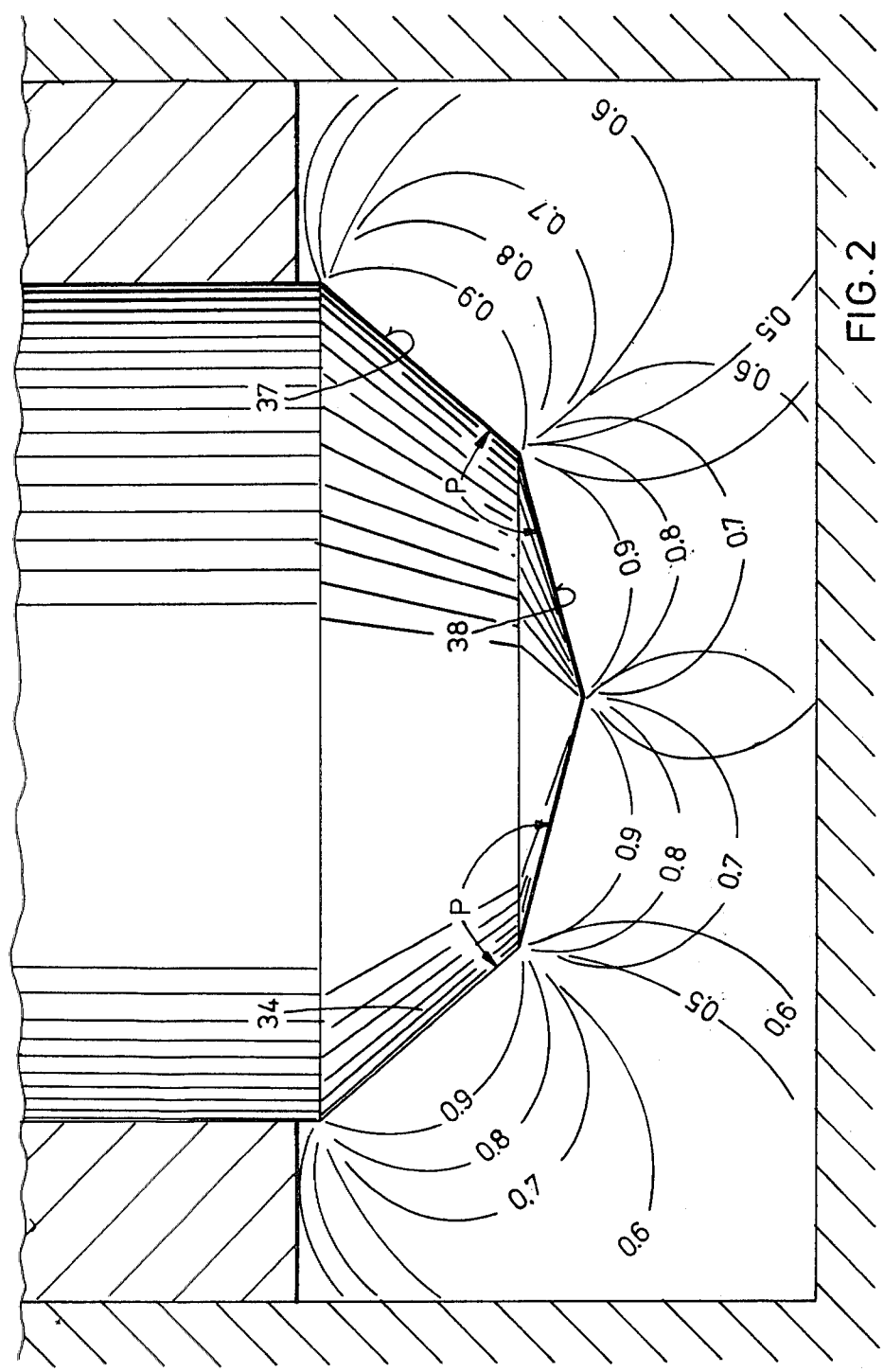
FIG. 2 is an explanatory diagram similar to FIG. 1 but applied, again according to the principles of soil mechanics, to a situation where the soil or refuse can creep or flow only within strictly limited confines.

FIGS. 1 and 2, as briefly mentioned above, illustrate the application of the rules of soil mechanics to the compression of a mass of waste material. These figures will be referred to again below in connection with an explanation concerning the shape of the head of the compression piston used in the pesent invention.

Figure 3:
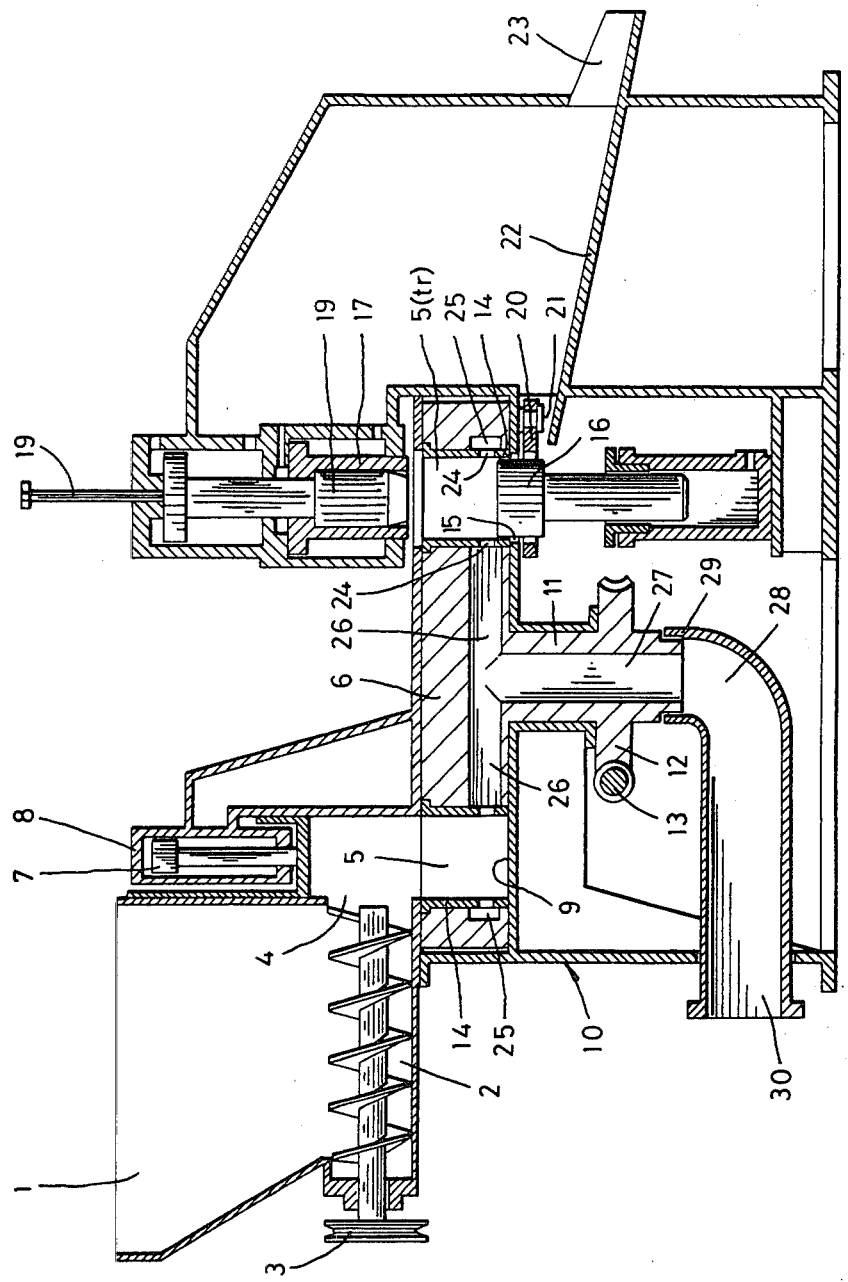
FIG. 3 is a diagrammatic view of a complete apparatus for carrying out the method according to the invention.

FIG. 3 illustrates an apparatus for treating waste material by compressing and separating it in accordance with the present invention. The apparatus comprises a hopper 1 into which the waste material is dumped and at the bottom of which there is an endless feed screw 2 rotated by conventional drive means, e.g., via a pulley 3. Feed screw 2 conveys the waste dumped into hopper 1 to a cramming chamber 4, the lower part of which is formed by a receptacle 5 set in a turntable 6 comprising a number of such receptacles 5 evenly spaced near its periphery. Situated above chamber 4 is a ramming piston 7 mounted in a cylinder 8. Piston 7 is intended to ram a certain amount of waste into receptacle 5. Turntable 6 rests on a plane surface 9 of a frame 10, shown only schematically, and comprises a tubular lower portion 11 which rotates in a vertical bore of frame 10 and includes rotation and indexing means 12, 13 situated below that bore.

A receptacle 5 filled with waste to be treated is moved into a treatment position (tr) which is that occupied by the receptacle 5 so designated at the right-hand side of FIG. 3.

The receptacles 5 are cylindrical, and the part which is sunk into turntable 6 is merely a cylindrical sidewall formed by an optionally interchangeable jacket 14 inserted in a vertical bore of turntable 6. In all positions other than the treatment position, the bottom of each receptacle 5 is formed by plane surface 9 of frame 10, as may be seen at the location of the left-hand receptacle 5 shown in FIG. 3. Thus, when turntable 6 rotates, the waste contained in each receptacle 5 slides over plane surface 9.

At the treatment location, however, plane surface 9 includes an opening 15 through which the crosshead of a counter-piston (or reaction piston) 16 can pass. The top of counter-piston 16 is a plane surface which is flush with plane surface 9 of frame 10 while turntable 6 is rotating. This is apparent from FIG. 5i illustrating the final phase of the treatment method.

In FIG. 3, counter-piston 16 has already been raised somewhat through opening 15 in order to enter at the bottom of the receptacle 5. In doing so, it slightly lifts the mass of waste to be treated, but without hindrance, for the top of the receptacle 5 is still open at that time, the waste previously having been rammed in and tamped down to just below the top rim of the receptacle 5.

Above the receptacle 5 at the treatment location is a piston arrangement comprising two coaxial or differential pistons, i.e. an outer piston 17 and an inner piston 18. Instead of allowing the top of the receptacle 5 to remain open at the treatment location, as explained above, it would also be possible to have pistons 17 and 18 lowered flush with turntable 6 in order to close off the top of the receptacle 5. In this case, independently of the prior filling and tamping down of waste in the receptacle 5, the raising of counter-piston 16 will only tamp the waste a little more, and pistons 17 and 18 will keep the waste from spilling out at the top.

Pistons 17 and 18 are guided in suitable cylinders forming part of frame 10; this compression-piston arrangement will be explained in more detail below with reference to FIG. 4. Inner piston 18, which is the more active in compressing the waste, comprises an upper indicator stem 19 which projects from frame 10 to show just how far the waste-treatment cycle has advanced.

As will be seen in connection with FIG. 5, piston arrangement 17, 18 enters the filled receptacle 5 in a manner calculated to extract liquid, semisolid, or viscous material from the mass of waste and to produce a practically dry, cohesive block made up of an agglomeration of solid waste. During and at the end of the compression treatment by piston arrangement 17, 18, counter-piston 16 sinks again almost to the level of plane surface 9, and then moves appreciably below that level so that the aforementioned block of waste exits through the open bottom of the receptacle 5 and is level with a pivoting block-ejector or extractor 20. When ejector or extractor 20 pivots about its vertical axis 21, the block of waste is moved onto a block-receiving ramp 22 down which it slides to a chute 23. Beneath chute 23, the blocks can be collected in suitable storage or transport containers.

As will be explained in more detail with reference to FIG. 5, the lower part of each of the jackets 14 forming the sidewalls of the receptacles 5 includes sludge-extraction apertures 24. At the level of apertures 24, each bore of turntable 6 in which a jacket 14 is inserted includes a circular recess 25 connected by a radial exhaust duct 26 to a vertical, tubular conduit 27 situated in the center of the tubular lower portion 11 forming the pivot of turntable 6. Conduit 27 is open at the bottom and constitutes within turntable 6 a collecting drain for sludge escaping from receptacles 5 via apertures 24. The inner end of a bent sludge-outlet pipe 28 set into frame 10 forms a sleeve 29 in which the lower end of tubular portion 11 is rotatably inserted. Thus, the sludge escaping through apertures 24 is collected at the mouth 30 of outlet pipe 28.

The overall structure and the general mode of operation of the compression-separation apparatus according to the present invention has thus been described above.

Figure 4:
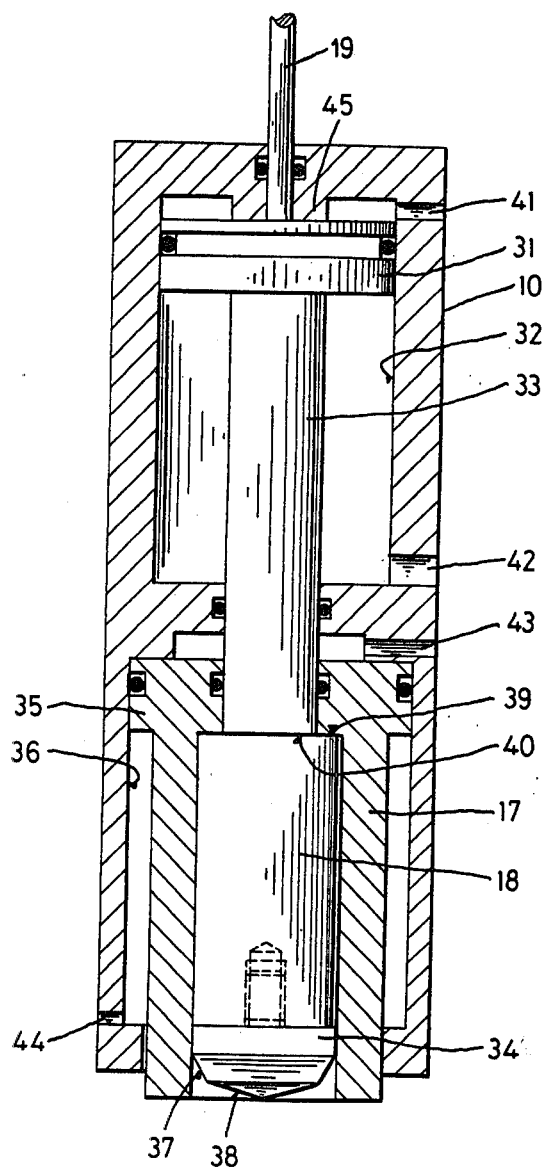
FIG. 4 is a sectional view of a piston arrangement forming part of the apparatus of FIG. 3, FIGS. 5a to 5i are partly sectional views illustrating the succession of operating phases of the apparatus of FIG. 3.

FIG. 4 shows the compression-piston arrangement 17, 18, 19 of FIG. 3 in more detail. A part of frame 10 forms a double cylinder for pistons 17 and 18 making up the compression-piston arrangement. Inner piston 18 comprises an upper crosshead 31, sliding in a cylindrical frame portion 32, and a narrow part 33 which slides both in a matching bore in a partition of frame 10 and in a matching bore in the crosshead 35 of outer piston 17. Crosshead 35 itself slides in a cylindrical bore 36 in frame 10. Inner piston 18 is provided with an interchangeable compression-head 34 having frustoconical and conical compression surfaces 37 and 38, respectively. It should be noted that in FIG. 3, drawn on a smaller scale, conical surface 38 has been replaced by a flat surface for purposes of simplification.

The diameter of the lower part of piston 18 is somewhat greater than the narrow part 33 of said piston and includes a shoulder 40 which abuts against a matching shoulder 39 of outer piston 17. When shoulders 39 and 40 are in engagement with one another, a downward movement of outer piston 17 brings about a like downward movement of inner piston 18; conversely, an upward movement of inner piston 18 causes a like upward movement of outer piston 17.

A center boss 45 at the top of cylinder 32 prevents crosshead 31 of inner piston 18 from rising beyond a certain height. Above that height, cylinder 32 has an inlet 41 for hydraulic fluid under pressure; and at the bottom of cylinder 32, just above the partition separating cylinders 32 and 36, there is a port 42 through which hydraulic fluid may exit at low pressure when piston 18 is forced downward. This is done by applying high pressure at inlet 41 while fluid leaves at low pressure through port 42. In this case, inner piston 18 descends alone, outer piston 17 remaining in its highest position. When high fluid pressure is applied at a hydraulic fluid inlet 43 in cylinder 36, above crosshead 35 of outer piston 17, this piston is pressed downward, while any fluid or air present below crosshead 35 can escape through a port 44 in cylinder 36. When outer piston 17 is thus pushed downward, it first catches up with piston 18 (if the latter has already moved down a certain distance); then, when shoulders 39 and 40 come in contact, piston 17 pulls piston 18 along downward.

To raise piston 18 again, the direction of the differential pressure between ports 41 and 42 is reversed, thus pushing crosshead 31 of piston 18 up again. Through the contact between shoulders 39 and 40, the rise of piston 18 likewise brings about the rise of piston 17, so that there is never any need to reverse the direction of the differential pressure acting upon piston 17. At most, port 43 should be freed to allow hydraulic fluid to leave.

FIG. 4 also shows indicator stem 19, which is integral with piston 18 and passes through the center of the top wall of cylinder 32.

Various gaskets are disposed at appropriate locations so that the pistons will operate properly in conjunction with the oil under pressure; FIG. 4 shows the positions of these various gaskets, to which no reference numerals have been assigned. Nevertheless, it should be noted that the gasket arrangement illustrated is intended for the situation where the space below crosshead 35 of outer piston 17 is filled with air; if it were filled with hydraulic fluid, an additional gasket would have to be disposed in the lower bore of cylinder 36 where outer piston 17 slides.

Frustoconical and conical surfaces 37 and 38 are determined in accordance with the rules of soil mechanics, corresponding to what is shown in FIG. 2, in order to ensure relatively constant compression of the waste material in the receptacle 5 positioned at the treatment location.

According to the nature of the waste to be treated, detachable compression head 34 may be exchanged in order to have conical or frustoconical compression surfaces adapted as well as possible to the creep or flow characteristics of the waste.

FIG. 5, consisting of nine views 5a to 5i, illustrates the process of compressing the waste material. FIG. 5a shows the phase which occurs immediately after that shown in FIG. 3. Counter-piston 16 has already risen within receptacle 5 and is blocking sludge-extraction apertures 24. Furthermore, piston arrangement 17, 18 has already started to enter receptacle 5 from above and to compress the waste material contained therein. Oil pressure applied at oil inlet 43 (FIG. 4) causes both pistons 17 and 18 to descend simultaneously and thus to compress the waste considerably, there being no exhaust possibility since apertures 24 are blocked by piston 16; this is the phase shown in FIG. 5b.

Figure 5A:
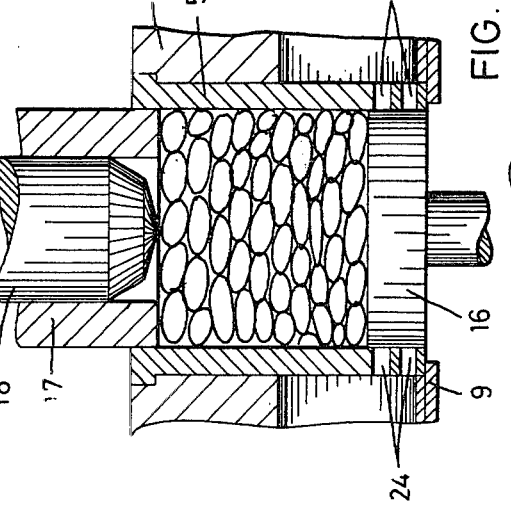
Figure 5B:
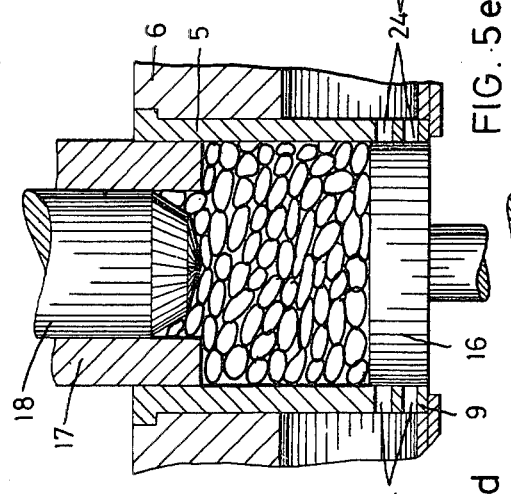
Figure 5C:
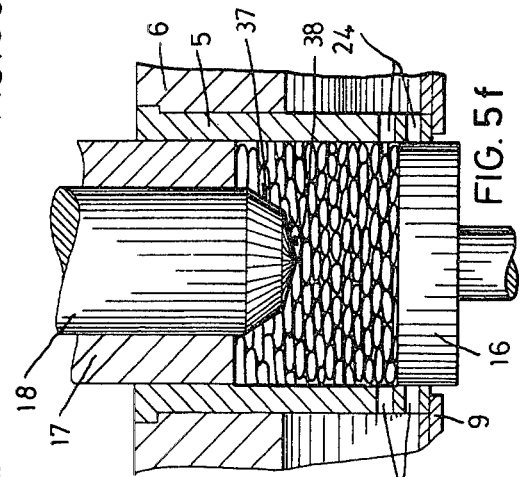

Next, as shown in FIG. 5c, oil pressure applied at inlet 41 (FIG. 4) causes center piston 18 above to descend; its surfaces 37 and 38 bring about substantially uniform compression throughout the whole mass of waste material, in accordance with what is illustrated in FIG. 2. Counter-piston 16 is controlled by oil pressure, as will be explained below in connection with FIG. 6. The oil-intake control valves in the cylinder controlling piston 16 are completely fluid-tight; since the oil cannot be compressed, counter-piston 16 remains stationary in whatever position it is caused to assume, no matter how much pressure is exerted upon it, as long as no oil can escape from the cylinder controlling it. In the oil circuit controlling this cylinder, pressure detectors detect the pressure prevailing in receptacle 5. When a certain given pressure (on the order of 100-500kg/sq.cm.) is reached, one of these pressure detectors, e.g., the one designated by reference numeral 46 in FIG. 6, operates to open an oil-exhaust valve, which allows counter-piston 16 to descend slightly so that some of the apertures 24 are no longer blocked. As soon as this descent of counter-piston 16 has caused the pressure to drop slightly, the oil is again blocked in the control cylinder, so that the phase during which piston 16 starts to fall, as shown in FIG. 5c, takes place at substantially constant pressure.

Figure 5D:
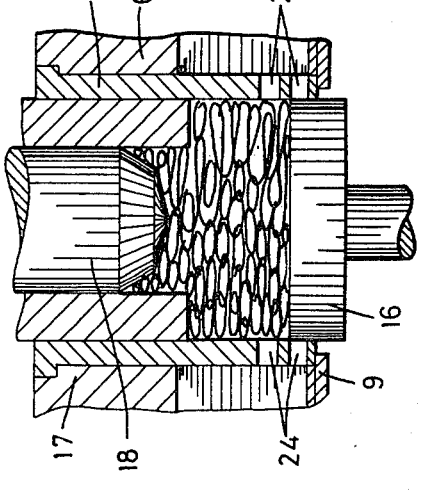
Figure 5E:
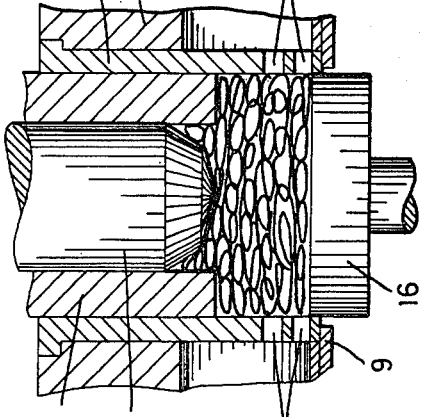

In the situation shown in FIG. 5d, outer cylinder 17 has been lowered a little farther so as to catch up with inner piston 18 (contact between shoulders 39 and 40); thus, the part of the waste material surrounding piston 18 in FIG. 5c, where less thorough compression may have taken place, is now compressed to the same extent as the rest of the waste. As shown in FIG. 5e, this sequence of operations continues, i.e., inner piston 18 advances alone, outer piston 17 catches up with it, and so on; and at a given moment, counter-piston 16 has descended far enough so that all the apertures 24 are uncovered, as may be seen in FIG. 5e.

Figure 5F:
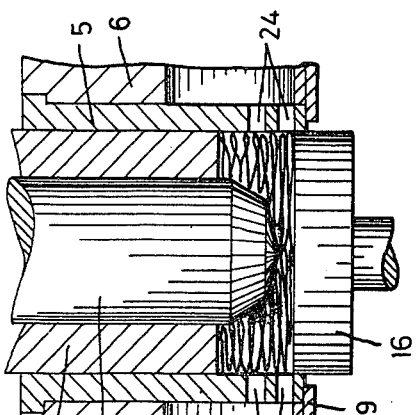
Figure 5I:
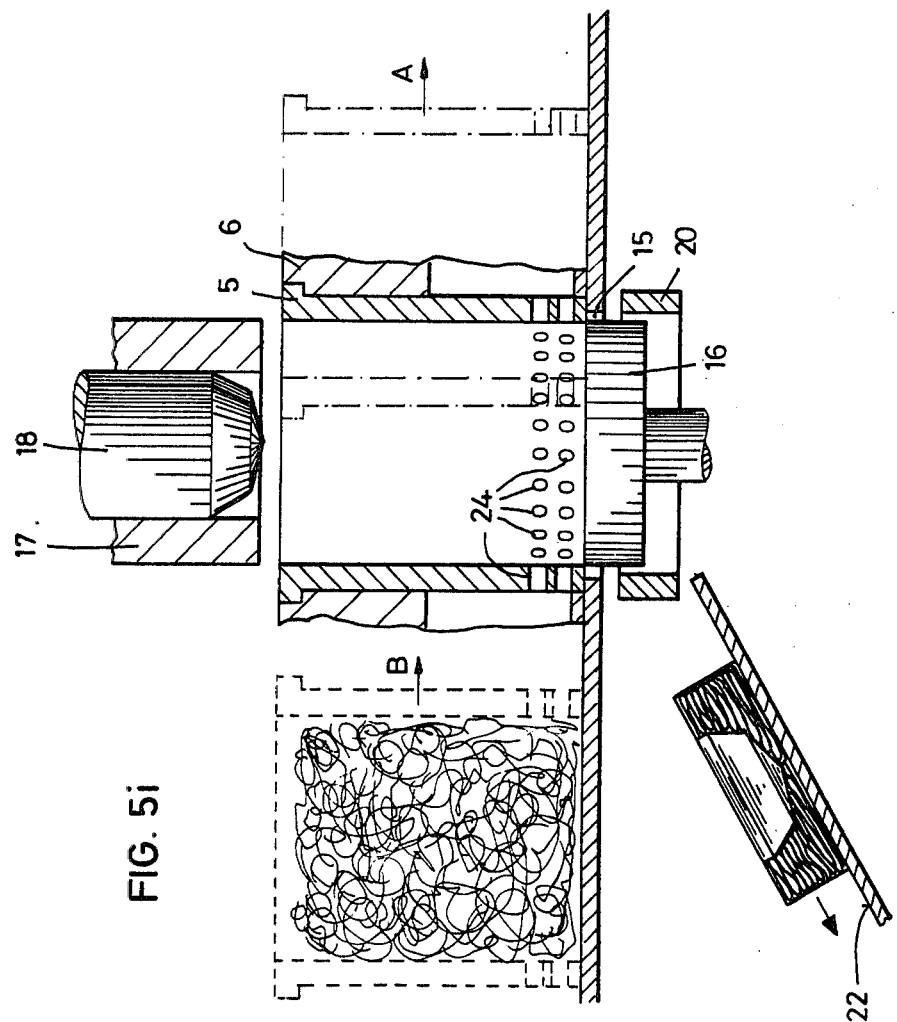
Figure 6:
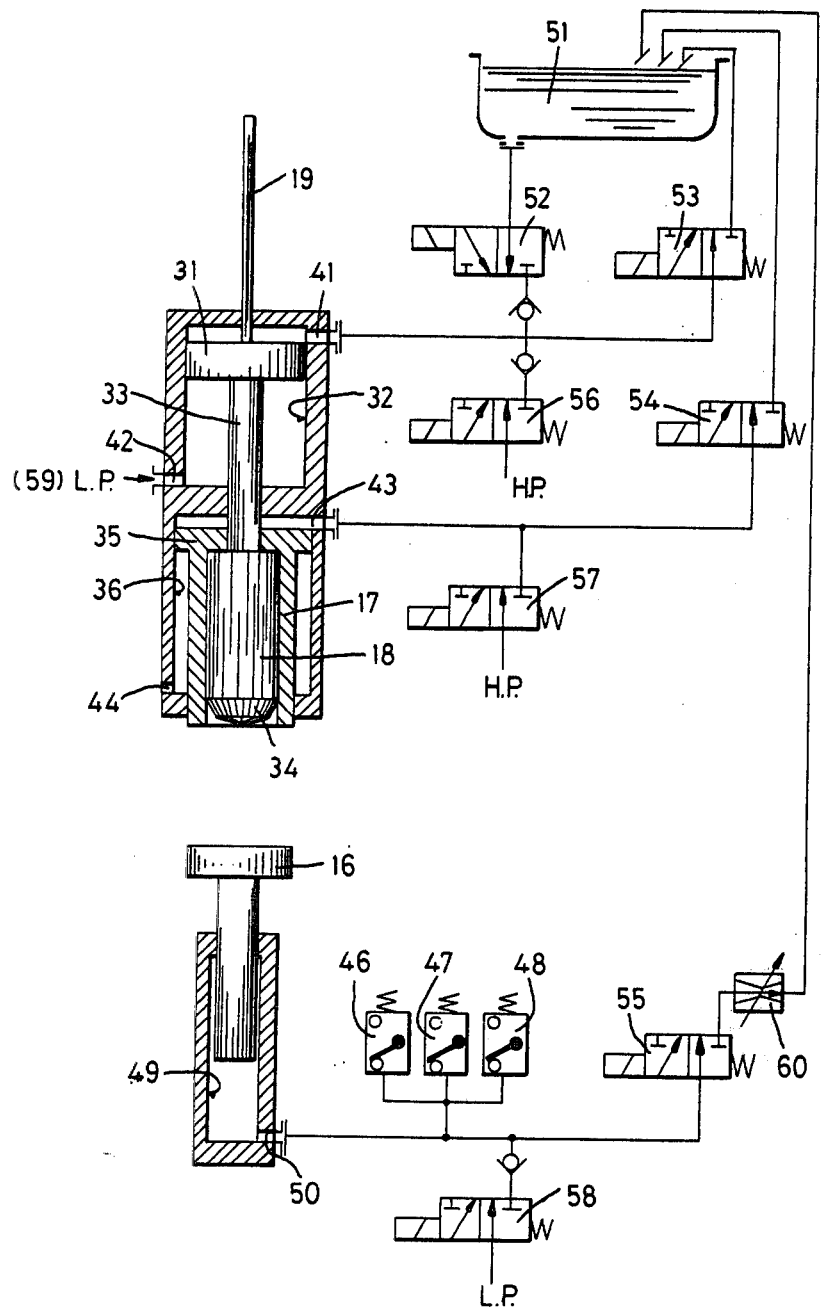
FIG. 6 is a diagram of the hydraulic control system of the piston arrangement of FIG. 4 and a counter-piston.

Under the effect of the pressure, starting from the situation shown in FIG. 5c and to an increasingly greater extent until the situation of FIG. 5e is reached, the liquid, semisolid, or viscous substances in the refuse being treated escape through apertures 24 and are collected via recess 25, conduits 26 and 27, and drain pipe 28 (FIG. 3). As soon as counter-piston 16 has assumed the position shown in FIG. 5e, as detected by sensor means (not shown), the pressure detector which had previously allowed counter-piston 16 to descend gradually (e.g., detector 46, FIG. 6) ceases its activity, and counter-piston 16 remains stationary. The alternating descent of pistons 17 and 18 goes on until the position shown in FIG. 5f is reached, when practically all the liquid, semisolid, or viscous material will have escaped through sludge-extraction apertures 24. This position is detected by means of an appreciably higher pressure value, e.g., via pressure detector 47 (FIG. 6). Once this degree of pressure is attained, the exhaust of oil from the cylinder controlling counter-piston 16 may resume; and under the effect of piston arrangement 17, 18, counter-piston 16, supporting a block of waste now substantially free of moist matter, descends to a position, shown in FIG. 5g, in which the block of agglomerated surface refuse has energed completely from the bottom of receptacle 5 through opening 15 (FIG. 3) in plane surface 9 of frame 10, and is situated in an opening in block-extractor 20.

At that moment, the differential pressure is reversed between hydraulic fluid inlets 41 and 42 (FIG. 4), and center piston 18 rises again, carrying outer piston 17 along. At the same time, as soon as the pressure of piston arrangement 17, 18 has ceased, block-extractor 20 moves out, as shown in FIG. 5h, and causes the block of waste to slide over the crosshead of counter-piston 16 onto the inclined surface of block-receiving ramp 22. Then, as shown in FIG. 5i, piston 16 rises until its top surface is flush with plane surface 9 (after the opening in block-ejector 20 has been realigned with opening 15), and piston arrangement 17, 18 rises above the upper surface of turntable 6 and the jacket forming the sidewall of receptacle 5.

In the situation depicted in FIG. 5i, turntable 6 can rotate to bring to the treatment location a new receptacle 5 filled with more waste to be treated. This procedure is illustrated in FIG. 5i, where an empty receptacle A, shown in dot-dash lines, is moving away, while a full receptacle B, shown in dashed lines, is moving into the treatment location. During this time, the block of waste is sliding down ramp 22 to be collected beneath chute 23 (FIG. 3). Counter-piston 16 may then rise to block apertures 24 of the new receptacle 5, while piston arrangement 17, 18 will sink into that receptacle from above; this position may, for example, be detected by means of a low pressure detector 48 (FIG. 6). The apparatus is now back in the situation shown in FIG. 5a, and the same cycle recurs.

In order to simplify the ejection of the blocks, block-ejector 20 includes two openings which alternately move to take up a position coaxial with receptacle 5. The other of these openings meanwhile pulls the block of waste out in order to remove it, this removal taking place once to the left and then to the right, which is in no way awkward since the blocks reach the chute 23 in any case.

In a particularly simple embodiment, the entire part of the apparatus comprising turntable 6 may be omitted, and the part comprising the pistons (righthand portion of FIG. 3) may be mounted horizontally. Ejector 20 may be eliminated since the blocks will fall by the force of gravity. Filling may advantageously take place through the orifice otherwise stopped by counter-piston 16, the latter then carrying out the tamping thereafter, so that piston arrangement 17, 18 need no longer be completely withdrawn from receptacle 5.

It will be noted that during the entire compression operation, i.e., from the situation of FIG. 5c to that of FIG. 5f, sludge containing water with organic matter and/or materials which can be used to enrich the soil, i.e., biologically useful materials, is collected at sludge outlet 30. Suitably conditioned, partially dried, or placed in sacks or containers, this sludge constitutes a highly worthwhile substance for enriching the soil. Moreover, the blocks discharged through chute 23 are made up of agglomerated refuse having good cohesion, i.e., they are not inclined to be brittle or crumble, so that they can readily be stored and then transported to serve especially as fuel briquettes in heating installations. These blocks or briquettes, containing almost no water, prove to be a much better fuel than the untreated garbage which is frequently burned in incinerator plants and which very often gives off more noxious fumes than heat.

FIG. 6 is a diagram of the hydraulic control system of the apparatus. It shows again the piston arrangement comprising central and outer pistons 18 and 17, as well as counter-piston 16, the latter being controlled by a hydraulic cylinder 49 to which oil is supplied through an oil inlet 50. The hydraulic valves of this control system must be completely fluid-tight; they are operated by relays or electric motors.

A valve 52 sends oil at atmospheric pressure (the pressure on an open oil tank 51) into inlet 41. Three valves 53, 54, and 55 are provided for allowing oil to escape through ports 41, 43, and 50, respectively. Because of the low position of cylinder 49 and port 50, a pump 60 is provided for exhausting this oil. Furthermore, two valves 56 and 57 send oil under high pressure (H.P.) into ports 41 and 43, respectively. Finally, a valve 58 sends oil under low pressure (L.P.), i.e., above atmospheric pressure but below the aforementioned high pressure, into port 50. This same low pressure is continuously applied at location 59 to port 42. It will be understood that by selectively controlling the relays or electric motors which actuate the various valves, there is no difficulty in producing the sequence of operations described above with reference to FIGS. 5a 5i, where the functions of pressure detectors 46, 47, and 48 have already been mentioned as well. Piston 18 is always controlled, by means of its crosshead 31, in opposition to the constant average L.P., application of the H.P. to port 41 causing piston 18 to descend, and application to port 41 of the virtually atmospheric pressure from tank 51 causing piston to move downward; in the upward direction, which is unimportant for the compression process, piston 17 is pulled along by inner piston 18.

It will be noted that in the method described above, there is never any significant redistribution of the mass of waste material during its compression for separation of liquid, semisolid, or vicous particles, so that the block of solid waste obtained after extraction of these materials is not very brittle. This result is achieved by means of highly uniform compression produced as shown schmatically in FIG. 2. In this figure—as also in FIG. 1—the fields of compression indicated by lines are to be imagined as tores, or doughnut-shaped configurations, passing above and below the plane of the figure about a vertical axis situated in the plane of the figure. This compression at relatively constant pressure, as well as the noncrushing of the mass being compressed—such crushing, as took place with prior art apparatus, being replaced by inner contraction or shearing of the particles of refuse—is responsible for the remarkable strength and tenacity of the blocks resulting from the method carried out by the apparatus, both according to the present invention. Moreover, a maximum of sludge is obtained in semisolid form, the degree of liquidity depending upon the nature of the waste material, containing organic matter and/or biologically useful materials which constitute valuable soil additives.

Reverting to FIG. 4, it will be seen that the profiles of the frustoconical and conical surfaces of compression head 34 are established in accordance with the laws of soil mechanics theory and that of the elasticity of materials (according to Hertz). This compression head might equally well have other geometric shapes, e.g., a paraboloid shape or one composed of different surfaces of revolution, ruled or non-ruled, these shapes always being governed by the laws of soil mechanics, taking into account the nature of the waste to be treated and the dimensions of the receptacle. As compression head 34 is interchangeable, the apparatus may easily be adapted in this way to the treatment of various kinds of waste materials having different creep of flow characteristics.

Since, as mentioned earlier, jackets 14 may likewise be interchangeable, sludge-extraction apertures 24 of different sizes may be provided, also adapted to the kind of waste to be treated and, if need be, to certain characteristics of the sludge it is desired to collect, e.g., the maximum dimension of the small solid particles permissible in the sludge.

What is claimed is:

1. In a method of compressively separating waste material, particularly waste composed at least partially of organic matter, in order to extract liquid or semisolid sludge containing water with organic matter and/or biologically useful materials, on the one hand, and solid blocks of compressed waste which are cohesive enough to be stored and handled in use, particularly as fuel briquettes, comprising the steps of
    placing in an open-ended receptacle a quantity of waste material to be treated, said receptacle having sludge extraction apertures,
    plugging the open end of the filled receptacle by means of a piston arrangement,
    closing the said sludge extraction apertures,
    thereafter causing a first compression of the waste material in the receptacle by means of a displacement of the piston arrangement to reduce the closed volume of the receptacle without allowing any material to escape therefrom,
    thereafter opening the sludge-extraction apertures, the cross-section of said apertures having a predetermined size so as to prevent the escape therethrough of non-flowable particles larger than said predetermined size, and
    then causing a further compression of the waste material in the receptacle by further displacement of the piston arrangement until virtually all of the liquid, semisolid, or viscous material has escaped through said apertures,
    said first and further compression steps being effected by providing the said receptacle and said piston arrangement with such a structural conformation that the entire mass of waste material compressed in the receptacle is subjected to substantially uniform pressure, the internal contractions and shearings within the mass of waste material being effected without crushing and by a succession of gradual elementary advances of the piston arrangement free of retractions and re-advances,
    and subsequently removing the compressed mass of waste material from the receptacle in the form of a homogeneous, dry, and solid compressed block structure.

2. The method of claim 1 further comprising before said step of first compression of said waste material, be preliminary steps of tamping down the waste material within the receptacle, filling in additional waste material, and likewise tamping down the additional waste material.

3. The method of claim 1 with said first and further compression steps are performed by a piston arrangement comprising two coaxial pistons, an inner one and an outer one, the receptacle being cylindrical and having an inside diameter substantially corresponding to the outside diameter of the outer piston,
    said compression steps comprising a first step of advancing the inner and outer pistons simultaneously into the waste material in the receptacle, and then a second step of advancing said pistons alternately.

4. The method of claim 3, wherein said structural conformation consists of:
    giving the receptacle a cylindrical shape whose inside diameter is substantially equal to the outside diameter of said outer piston and
    giving the head of said inner piston a shape comprising a frustoconical surface wherein the angle between the generating line of said frustoconical surface and the axis of said piston has a value which ensures the substantial uniformity of the pressure within the mass of waste material.

5. The method of claim 1, with said piston arrangement consisting of a single piston,
    said steps of first and further compressions being performed with said structural conformation consisting of:
    giving said receptacle a cylindrical shape whose inside diameter is substantially equal to the outside diameter of said single piston, and
    giving the head of said single piston a shape comprising a frustoconical surface wherein the angle between the generating line of said frustoconical surface and the axis of said piston has a value which ensures substantial uniformity of the pressure within the mass of waste material.

6. The method of claim 4 or claim 5, wherein said piston head is provided, beyond said frustoconical surface, with a conical surface the generating line of which forms a larger angle with the axis of said piston than that formed by the generating line of said frustoconical surface.

7. The method of claim 1, wherein said receptacle has an open bottom which is selectively closed by a counter-piston, said sludge-extraction apertures being located in the sidewalls of said receptacle closely adjacent to the said bottom, said step of closing said sludge extraction apertures being effected by inserting said counter-piston into the open bottom of the cylindrical receptacle to an extent sufficient to block said apertures, and said step of opening said sludge extraction apertures being effected by thereafter retracting said counter-piston gradually in response to pressure exerted during the compression step by the piston arrangement facing the counter-piston.

8. The method of claim 7 comprising the step of further retracting said counter-piston after said step of further compression, when the compression of the waste material has reached the point where virtually all of the liquid, semisolid, or viscous material has escaped, said further retraction being sufficiently great to cause the counter-piston to move away from the open bottom of the receptacle until the block of solid material resulting from the further compression step is situated beyond the bottom of the cylindrical portion of the receptacle and is thereby removed from the receptacle, and thereafter repositioning the piston arrangement within the receptacle in preparation for a new placement of waste material into the receptacle.

9. In an apparatus for compressively separating waste material, of the type comprising at least one cylindrical receptacle adapted to be filled with a quantity of waste material to be treated, a piston arrangement adapted to enter said receptacle to effect the compression of said waste material, said piston arrangement comprising an assembly of two coaxial pistons, an inner one and an outer one, the inside diameter of said receptacle corresponding to the outside diameter of the outer piston of the piston arrangement, and a counter-piston adapted to form the bottom of the receptacle and adapted to be advanced into said receptacle to block sludge-extraction apertures situated in the portion of the sidewall of the receptacle adjacent the bottom thereof in order to ensure pre-compression without any escape of the mass of waste material, said counter-piston thereafter being retracted to open said apertures while the piston arrangement continues its compression action thereby to cause the explusion through said apertures of all the liquid, semisolid, or viscous material from the mass of waste material, the improvement comprising:

a conformation of said inner piston of said piston arrangement including at least one piston having a pressure head of a shape exhibiting a frustoconical surface the generating line of which has a predetermined angle to the axis of the piston and, at the end of this frustconical surface, a conical surface, the generating line of which has a larger angle to the axis of the piston than said predetermined angle, the dimensions and the angles of said conical and frustoconical surfaces being so determined with respect to the dimensions of said cylindrical receptacle as to maintain, by virtue of the laws of soil mechanics, applied in the case of a volume of limited creep, a substantially uniform pressure throughout the mass of waste material in the receptacle.

10. The apparatus of claim 1, wherein said dimensions and said angles of said conical and frustoconical surfaces are established, in conformity with the principles of soil mechanics in the case of a space with limited creep, in such a way that the pressure at those locations where the lowest pressure prevails is at least equal to approximately half the pressure prevailing at those locations having the highest pressure.

11. The apparatus of claim 9 or claim 10, wherein said counter-piston is arranged to be retracted from the bottom of said receptacle by an amount sufficient to cause the entire mass of compressed waste material resting against the counter-piston to leave the receptacle completely and to be discharged in the form of a block.

12. The apparatus of claim 9 or claim 10, including hydraulic control means operative to control said pistons of the piston arrangement and said counter-piston in such a way that, at the start of the operation, the counter-piston remains stationary in a position in which it blocks said apertures while the two pistons forming the piston arrangement advance simultaneously, thereby to cause a first compression of said waste material without escape of any of the waste material from said receptacle, said hydraulic control means being operative, after a certain pressure has been applied to the mass of waste material, to cause said counter-piston to retract gradually so as to free said apertures while said two pistons forming said piston arrangement advances alternatingly by steps whose advancing length never exceeds a certain value less than the diameter of the inner piston.

13. A solid block and/or liquid or semi-solid sludge compressed by the method of claim 1.

14. The solid block of claim 13, being of a size and consistency rendering it suitable for use as a fuel briquette in a heating installation.

* * * * *